(12) United States Patent
Ledman

(10) Patent No.: US 7,520,398 B1
(45) Date of Patent: Apr. 21, 2009

(54) GIN HOIST

(76) Inventor: James A. Ledman, E9854 Hwy. SS, Viroqua, WI (US) 54665

( * ) Notice: Subject to any disclaimer, the term of this patent is extended or adjusted under 35 U.S.C. 154(b) by 0 days.

(21) Appl. No.: 12/147,120

(22) Filed: Jun. 26, 2008

Related U.S. Application Data

(60) Provisional application No. 60/947,175, filed on Jun. 29, 2007.

(51) Int. Cl.
*B66C 23/18* (2006.01)
(52) U.S. Cl. .............................. 212/179; 254/134.3 PA
(58) Field of Classification Search ................. 212/179; 254/134.3 PA
See application file for complete search history.

(56) References Cited

U.S. PATENT DOCUMENTS

| | | | |
|---|---|---|---|
| 2,128,712 A | | 8/1938 | Neff |
| 2,213,604 A | * | 9/1940 | Lennert ...................... 248/214 |
| 2,252,514 A | * | 8/1941 | Kuenzi ........................ 254/394 |
| 2,309,769 A | | 2/1943 | Hubbard |
| 2,553,779 A | * | 5/1951 | McLain et al. ...... 254/134.3 PA |
| 2,728,462 A | * | 12/1955 | Fincher ...................... 212/179 |
| 2,902,257 A | * | 9/1959 | Young ................. 254/134.3 PA |
| 3,064,824 A | | 11/1962 | Beatty |
| 3,266,775 A | | 8/1966 | Coe |
| 3,472,395 A | | 10/1969 | Hubbard et al. |
| 3,945,502 A | | 3/1976 | Diener |
| 4,105,347 A | | 8/1978 | Gossage |
| 5,031,605 A | | 7/1991 | Mills |
| 5,056,673 A | | 10/1991 | Williams |
| 6,129,225 A | * | 10/2000 | Giannoglou et al. ........ 212/179 |
| 7,044,313 B2 | * | 5/2006 | Haliburda, III .............. 212/179 |
| 7,216,850 B2 | * | 5/2007 | Kwon ......................... 254/395 |

OTHER PUBLICATIONS

"One Source", Hi-Line Utility Supply catalog, 2007, pp. 129 and 136.

* cited by examiner

*Primary Examiner*—Thomas J. Brahan
(74) *Attorney, Agent, or Firm*—Lathrop & Clark LLP

(57) ABSTRACT

A gin hoist adapted for attachment to the cross arm of a power pole. The gin hoist includes a base support structure with two side rails connected by rungs, an upper load bearing member that rests on the top surface of the cross arm and a lower load bearing member that is adapted to engage lower surface of the cross arm such that the base support structure inclines at an angle to the cross arm appreciably less than 90 degrees. An extending support structure is attached to the base support structure. A hoist attaches to the base support member with a load bearing strap engaged therein and running over the top of the base support member and over the distal end of the extending support member. The strap has a cable engagement device at its end.

12 Claims, 3 Drawing Sheets

GIN HOIST

This application claims the benefit of U.S. Provisional Application No. 60/947,175 filed on Jun. 29, 2007, the entire disclosure of which is incorporated herein by reference.

BACKGROUND OF THE INVENTION

1. Field of the Invention

This invention generally relates to gin hoists that raise and lift cables of various kinds overhead to assist working linemen.

2. Related Art

There are varying kinds of hoists and gins in the prior art to assist linemen in lifting cables to perform work on existing support structures or to erect new support structures with cables. For example, there are gin hoists that lift electrical cables under heavy tension from the insulators that support them so linemen can perform service or repairs. While the prior art discloses technology to lift cables, there are disadvantages.

The gin hoists of the prior art have limited capabilities of redistributing the loads encountered when lifting the cables. This presents problems for the work vehicle and gin hoist when lifting heavy cables. The gin hoists must be large and cumbersome to lift the heavy cables using the prior art. This does not allow current gin hoists a wide range of movement both along the pole and at varying angles when lifting the cables. Further, current gin hoists do not allow access by work vehicles to all areas around the work site. Additionally, the size of the prior art gin hoists does not allow for easy or compact storage.

OBJECTIVES OF THE INVENTION

An objective of this invention is to provide a gin hoist that is compact and capable of use in otherwise difficult or inaccessible areas. The gin hoist mounts easily to cross arm construction on utility poles or the like, and is self-supporting and compact. The compactness and ease of movement allows the lineman to easily move the gin hoist to various positions and at varying angles. The gin hoist also lightens physical strain on the lineman while permitting the raising and lifting of heavy cables. The gin hoist is easily compacted and stored in a vehicle.

This invention provides a gin hoist that is compact and easily moved to various points on a cross arm of a pole.

This invention separately provides a gin hoist that may be positioned at various angles depending on the working situation.

This invention separately provides a gin hoist that has a strap hoist that is located near the cross arm of the pole.

This invention separately provides a gin hoist that can be stored in a compact space in a work vehicle.

SUMMARY OF THE INVENTION

In various exemplary embodiments according to this invention, a gin hoist is adapted to be attached to a cross arm of a pole. The gin hoist may have a base support structure and an extending support structure, both of which may include a pair of opposed, spaced side rails, with numerous rungs extending between the side rails. The base support structure may have holes to attach the extending support structure using securing fasteners. The base structure may be attached to the cross arm using an anchor support structure which will prevent the gin hoist from falling backwards while allowing the gin hoist to be easily moved laterally along the cross arm. Finally, the base support structure's rungs may support a strap hoist with a load bearing strap that runs along the base support structure and supports the end of the extending support structure. Hooks or other fastening structure attached to the strap hoist may be engaged with a rung or other structure on the base support structure. Hooks or other engaging structure may also be engaged with a cable. A lineman may operate the strap hoist by a lever to retract or extend the load bearing strap from the hoist and thereby raise, lower, and support the cable for installation, service, and removal of the cable from the cross arm structure, which may include insulators to support the cable.

In various exemplary embodiments according to this invention, the gin hoist may have a base support structure, and an extending support structure, both with a plurality of rungs. The extending support structure may be attached to the base support structure using securing fasteners. The base structure has a lower yoke end which is attached to a cross arm by a base anchor bolt extending beneath the cross arm, and a rung on the base structure extending across the top surface of the cross arm. Finally, the base support structure's rungs support a strap hoist with a load bearing strap that runs along the base support structure and supports the end of the extending support structure mounted on the base support structure. A hook attached to the strap hoist may engage a rung on the base support structure. A second hook or other cable support member is attached to the distal end of the load bearing strap to engage and support the cable. A lineman may reciprocate the strap hoist lever, to retract and/or extend the load bearing strap and thereby raise and/or lower the cable from its resting point.

These and other features and advantages of various embodiments of systems and methods according to this invention are described in, or are apparent from, the following detailed descriptions of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not limited to the particular embodiments illustrated herein.

DETAILED DESCRIPTION OF THE INVENTION

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that minor or insignificant modifications or alterations of the subject matter (e.g., those which do not significantly impair or alter performance or functionality) described and claimed are considered to be within the scope of the invention as recited in the appended claims.

Figure 1:
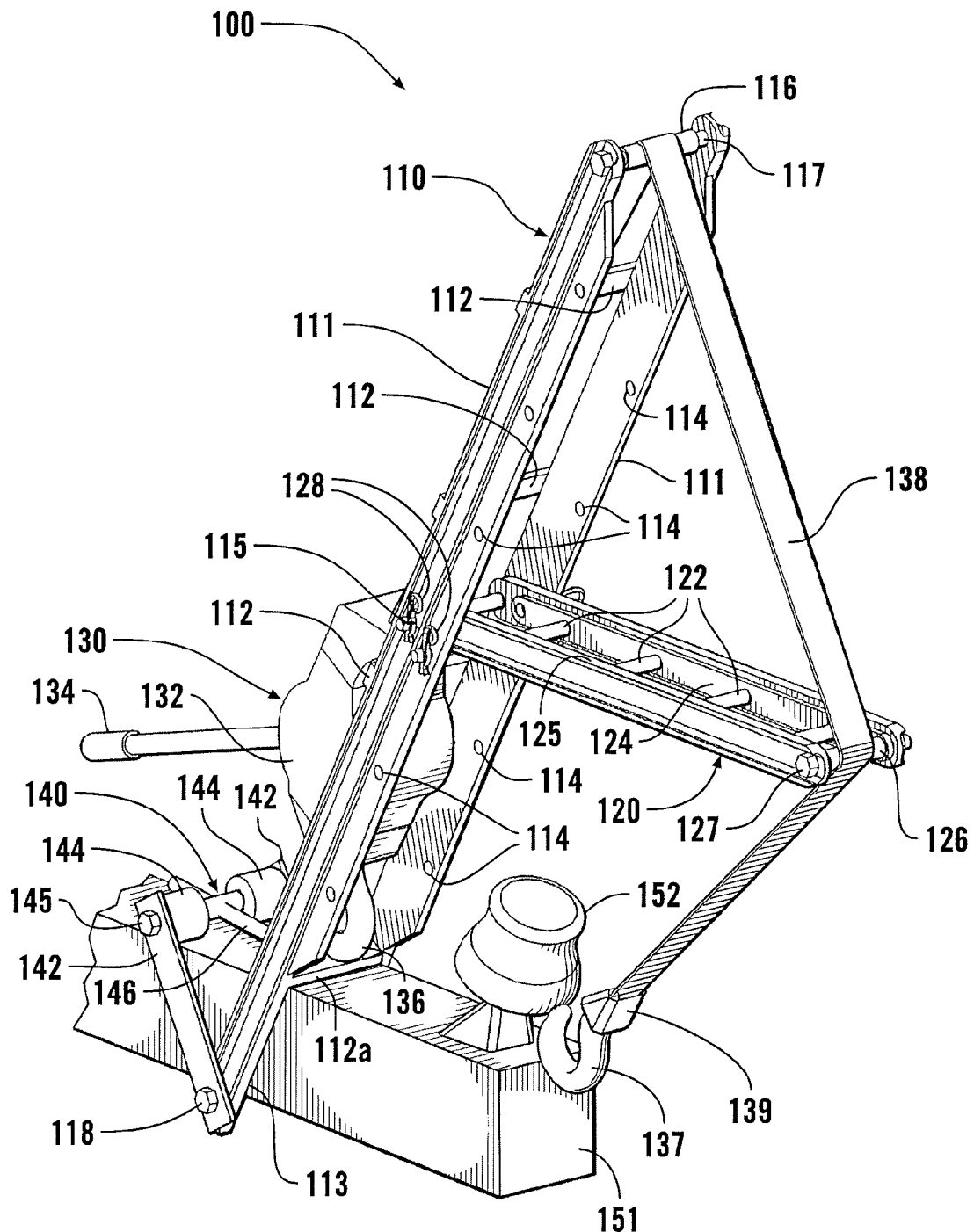
FIG. 1 is a schematic perspective view showing a first exemplary embodiment of a gin hoist according to the present disclosure.

FIG. 1 shows an exemplary embodiment of a gin hoist 100 according to the present disclosure. A base support structure 110 has rungs 112 extending between a pair of side rails 111, holes 114 and 115 in the side rails in such numbers and locations as desired, a first strap support 116 with a support bolt 117, and an anchor bolt 118. The base support structure has a yoke 113 at its lower end. An extending support structure 120 attaches to the base support structure 110 using securing fasteners 128. The extending support structure 120 extends outwardly from the base support structure 110, and has rungs 122, inner support arms 124, outer support arms 125, and a second strap support 126 with a support bolt 127. The extending support structure may be pivotally mounted by a fastener 128 extending through base support structure holes 115 and the inner ends of the outer support arms 125, but prevented from pivoting downward from the position shown in FIGS. 1 and 2 by a second fastener 128 extending through holes 114 in the base support structure 110. The holes 114 and 115 through which the fasteners 128 extend are juxtaposed so that the extending support structure will be firmly supported in a substantially horizontal position to resist downward movement under load.

A strap hoist 130 is attachable to the base support structure 110. The strap hoist 130 has a hoist housing 132, a hoist lever 134, a first hook 136 which may be attached to one of the rungs 112, a load bearing strap 138, and a second hook 137 attached to the distal end of the strap 138 by a strap-hook connect 139 to raise, lower, or otherwise support a cable, and to facilitate attachment and detachment of the cable with respect to an insulator 152 mounted on a cross arm.

Figure 2:
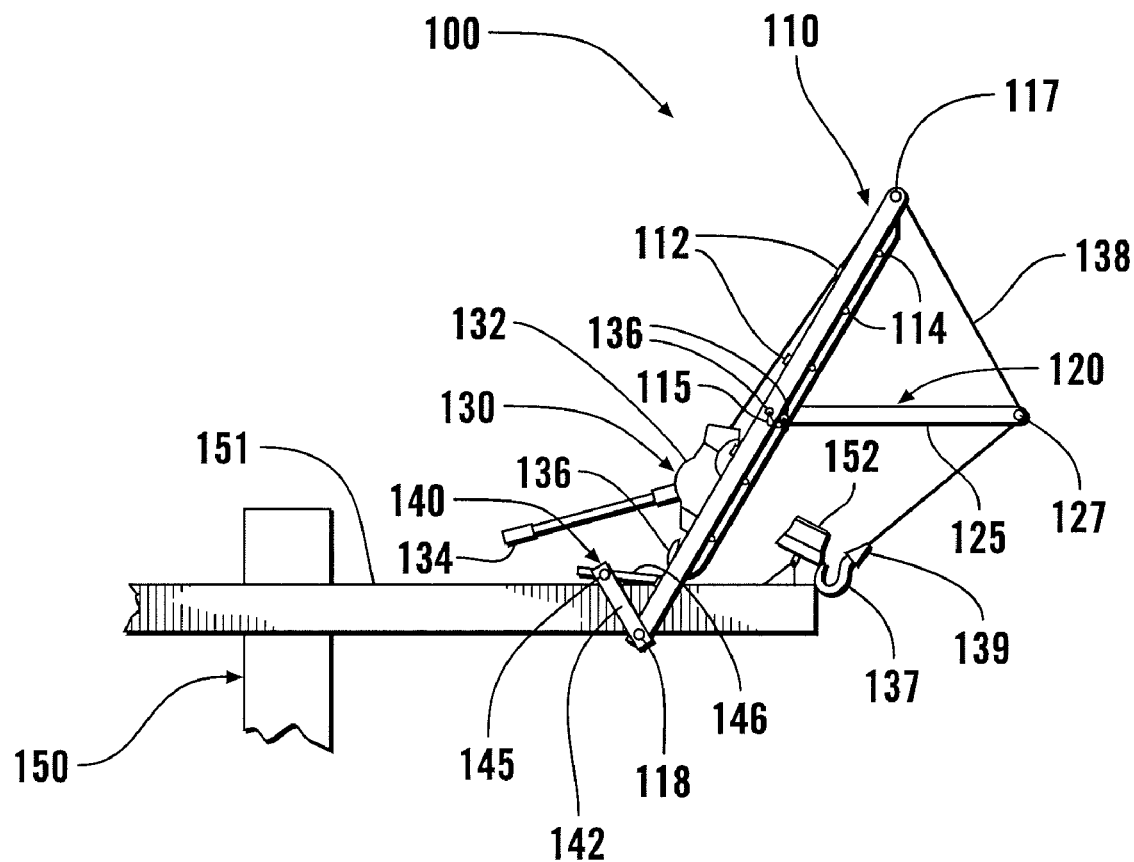
FIG. 2 is a side view of the first exemplary embodiment of a gin hoist as shown in FIG. 1.

The base support structure 110 is adapted to engage a cross arm 151 on a power pole. The yoke 113 at the lower end of the base support structure is adapted to straddle a cross arm. The yoke 113 includes an upper load bearing member, which may be bottom rung 112a, and a lower load bearing member, which may be anchor support bolt 118. The upper and lower load bearing members 112a and 118 are spaced apart a greater distance than the vertical thickness of the cross arm 151 so that the base support structure 110 will be inclined from the vertical to engage the upper load bearing member 112a against the top surface of the cross arm and the lower load bearing member 118 against the bottom surface of the cross arm, as shown in FIGS. 1 and 2. The distance between the upper and lower load bearing members 112a and 118 may be varied to affect the gin hoist's operating angle, which is a function of this distance relative to the vertical thickness of the cross arm. In various embodiments, the angle of the base support structure to the cross arm is substantially less than 90 degrees. Cross arms typically come in two sizes, referred to generally as "light" or "heavy." Light cross arms have a vertical thickness of about 4 to 4.5 inches. In an exemplary embodiment adapted for use with light cross arms, the distance between the upper and lower load bearing members 112a and 118 is about 4.5 to about 5 inches. Heavy cross arms have a vertical thickness of about 5 inches. In an exemplary embodiment adapted for use with heavy cross arms, the distance between the upper and lower load bearing members 112a and 118 is about 5.5 inches. An anchor support structure 140 extends from the base support structure 110 and may have side supports 142, support wheels 144, a wheel bolt 145, and a catch support 146. The side supports 142 attach to the yoke 113 of the base support structure 110 using the anchor bolt 118 which extends between the side supports 142 and the base support structure side rails 111.

FIG. 2 shows a side view of the gin hoist 100 of FIG. 1, attached to cross arm 151 of a pole 150. The gin hoist 100 attaches to the cross arm 151 of the pole 150 using the catch support 146 of the anchor support 140, the anchor support bolt 118, the supports 142, and bottom rung 112a, shown in FIG. 1. As the gin hoist 100 rests at an angle on the cross arm 151, the support bolt 118 and the bottom rung 112a act as stops to prevent the gin hoist 100 from falling or inclining forward under load conditions. The catch arm 146 attached to the side supports 142 using the wheel bolt 145 and to the bottom rung 112a acts as an additional stop to prevent the gin hoist 100 from falling back toward the pole 150 when the strap hoist 130 is in use and the gin hoist 100 is attached to the cross arm 151 as shown.

The wheels 144 allow the gin hoist 100 to move laterally along the cross arm 151. If a new position is desired for the gin hoist 100, the base structure 110 can be slightly lifted back from the cross arm 151 to a slightly more vertical position supported by the wheels 144 of the anchor support 140 to separate the lower load bearing member 112a from the top surface of the cross arm 151. A lateral force can then be applied to the gin hoist to move it towards the line insulator 152, or away from the line insulator 152 and toward the pole 150, as desired. After the gin hoist 100 has been moved to the desired location, the bearing member 112a is again rested on the cross arm 151, and the gin hoist 100 can be used to raise, support and lower cables.

As shown in FIGS. 1 and 2, the extending support structure 120 attaches to the base support structure 110 using the securing fasteners 128 inserted through the holes 115 and through holes near ends of the outer support arms 125. Additional securing fasteners 128 may be inserted and secured between holes 114 in side rails 111 which are juxtaposed with respect to holes 115 so that the additional securing fasteners 128 will support the extending support structure 120 in cantilever relation on the base support structure 110. It will be appreciated that the securing fasteners 128 may be bolts and nuts, pins and cotter keys, or other securing fastening devices now known or later developed. The inner support structure 124 of the extending support structure 120 can rotate about the second strap support bolt 127. This rotation permits the inner support 124 to attach at varying positions along the base support structure 110, using the holes 114 and the securing fasteners 128, while providing triangulation structure for additional support when the gin hoist 100 lifts cables.

As shown in FIGS. 1 and 2, the strap hoist 130 may be operated to raise and lower cables into the appropriate positions by linemen or other types of workers. The strap hoist 130 attaches to the base support structure 110 using the first hook 136 attached to a rung 112 or other structural member, and the tension created from the load bearing strap 138 lifting a cable. The strap 138 may be a synthetic or naturally made strap or the like capable of exhibiting strength under high tension. When the second hook 137 hooks a cable (not shown), the strap hoist lever 134 operates to winch and retract the strap 138 in a conventional manner to lift the cable from a line insulator 152. The strap 138 extends from the strap hoist 130 to the first strap support 116 supported by a first strap support bolt 117; the strap hoist 130 then further extends to the second strap support 126 supported by a second strap support bolt 127; the distal end of the strap 138 is attached to the second hook 137 using the strap hook connect 139.

Figure 3:
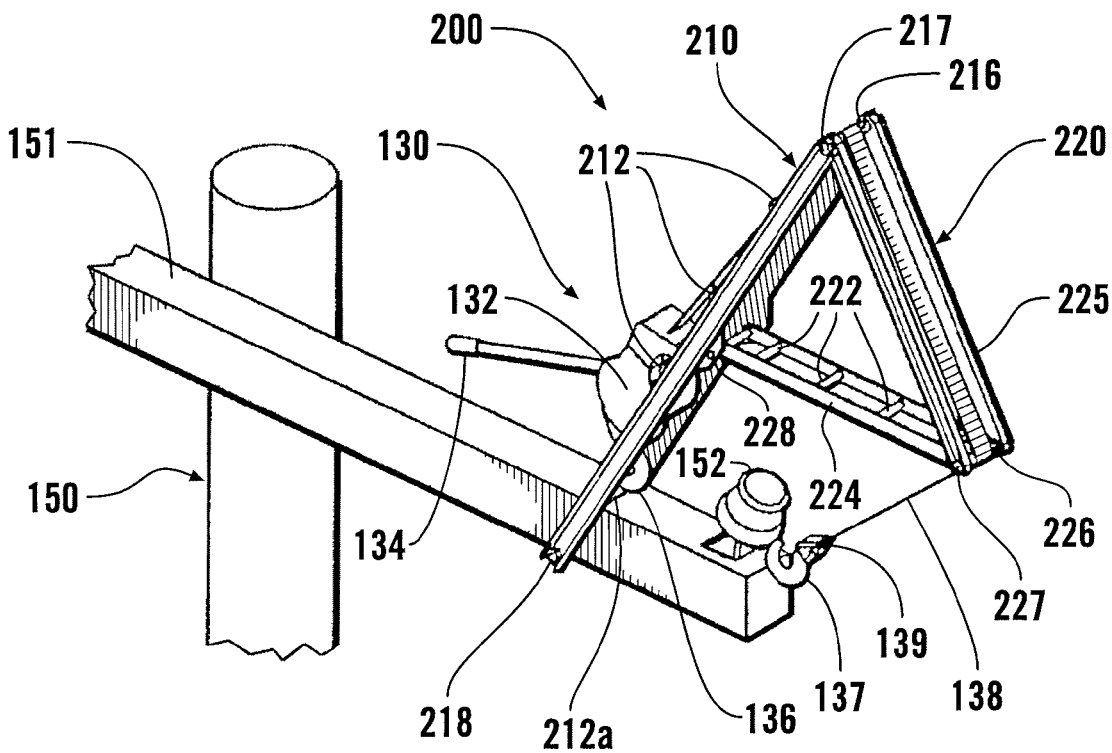
FIG. 3 is a schematic perspective view showing a second exemplary embodiment of a gin hoist according to the present disclosure.

FIG. 3 shows another exemplary embodiment of a gin hoist 200 according to the present disclosure. A base support structure 210 has rungs 212, a first strap support 216 with support bolt 217, and an anchor bolt 218. An extending support structure 220 attaches to the base support structure 210. The extending support structure 220 has rungs 222, an inner support 224, an outer support 225, a second strap support 226 with a support bolt 227, and securing fasteners 228. The securing fasteners 228 are similar to the securing fasteners 128, as shown in FIGS. 1 and 2. Attached to the base support structure 210 is the strap hoist 130 as shown in FIGS. 1 and 2. The base support structure 210 anchors to the cross arm 151 using the anchor bolt 218 and lower rung 212a in the same manner as previously shown and described with respect to the gin hoist embodiment of FIGS. 1 and 2.

Figure 4:
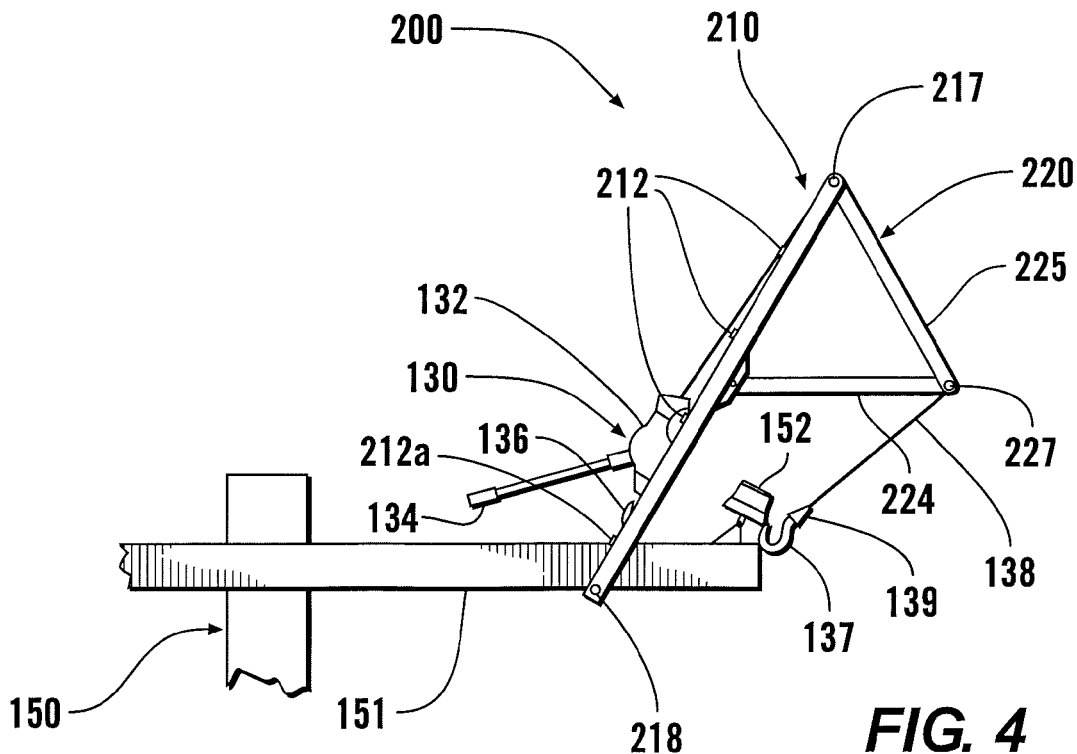
FIG. 4 is a side view of the second exemplary embodiment of a gin hoist shown in FIG. 3.

FIG. 4 shows a side view of the gin hoist 200 attached to the pole 150 of FIG. 3. The gin hoist 200 attaches to the cross arm 151 of the pole 150 using the anchor support bolt 218 and a bottom rung 212a. As the gin hoist 200 rests at an angle on the cross arm 151, the support bolt 218 and the bottom rung 212a act as stops to prevent the gin hoist 200 from pivoting forward under load in the same manner as described above with respect to gin hoist 100 shown in FIGS. 1 and 2.

As shown in FIGS. 3 and 4, the extending support structure 220 attaches to the upper end of the base support structure 210 using the first strap support bolt 217. The inner support 224 is shown as it is attached at one of its ends to the free end of the outer support structure 225, using the second strap support bolt 227. The inner support structure 224 is also attached at its other end to the base support structure 210 near its mid-point by securing fasteners 228. The pinned attachment of the base support structure 210, inner support 224, and outer support 225 form a structural triangle, or truss, for increased strength and stability while lifting and supporting cables.

The inner support structure 224 may be detached from the base support structure 210 and pivoted or rotated about the second support bolt 227. This rotation permits the inner support 224 to fold upwards and permits the outer support 225 to rotate about the first strap support bolt 217. This folding action allows the extending support structure 220 to fold into the base support structure 210 and creates a compact gin hoist 200 for efficient transport and storage when not in use.

As shown in FIGS. 3 and 4, the strap hoist 130 operates to raise and lower cables into the appropriate positions for attachment, detachment and service by linemen or other type of workers. The strap hoist 130 attaches to the base support structure 210 using the first hook 136 attached to a rung 212. When the second hook 137 hooks a cable, the strap hoist lever 134 is operated to winch and lift the cable from its line insulator 152 by means of the strap 138. The strap 138 is run from the strap hoist 130 to the first strap support 216 supported by a first strap support bolt 217; the strap hoist 130 is then run to the second strap support 226 supported by a second strap support bolt 227; the remaining portion of the strap 138 is attached to the second hook 137 using the conventional strap hook connect 139.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A gin hoist for lifting and supporting electrical cable to and from a cross arm attached to a power pole or other cable support structure, comprising:
    a base support structure having a lower yoke end adapted to straddle a cross arm, the yoke including upper and lower load bearing support members spaced by a greater distance than the vertical thickness of the cross arm to respectively bear on the upper and lower surfaces of the cross arm and orient the base support structure on the cross arm at an angle of substantially less than 90° to the cross arm;
    an extended support structure pivotally engaged on the base support structure and having a first position in which it is fixed at an outwardly extending angle to the base support structure and a second position in which it lies closely adjacent to the base support structure;
    the base support structure having a first strap support member located at its upper end for supporting a load bearing strap; and
    the extended support structure having a second strap support member located at its distal end for supporting a load bearing strap;
    an anchor support structure extending from the lower yoke end of the base support structure in the opposite direction from that of the extended support structure, the anchor support structure being adapted to engage the upper surface of a cross arm and being rigidly maintained at a fixed angle with respect to the base support structure to prevent the base support structure from pivoting or falling in said opposite direction.

2. The gin hoist of claim 1, including a strap hoist attached to the base support structure, the strap hoist having a load bearing strap adapted to extend therefrom over the base support structure first strap support member and over the extended support structure second strap support member, the strap having a cable engagement member at its distal end, and the strap hoist being operable to retract and extend the strap therefrom to permit the cable engagement member to engage, raise, lower, and support an electrical cable.

3. The gin hoist of claim 1, wherein the anchor support structure has side supports extending from fixed engagement with the lower load bearing support member, and a rigid catch support structure extending from the upper load bearing member to engage the free ends of the side supports to form a rigid triangular anchor support structure with the base support structure.

4. The gin hoist of claim 1, wherein the distance between the center of the lower support and the center of the upper support is about 4.5 to about 5.5 inches.

5. The gin hoist of claim 4, wherein the distance between the center of the lower support and the center of the upper support is about 4.5 to about 5.0 inches.

6. The gin hoist of claim 4, wherein the distance between the center of the lower support and the center of the upper support is about 5.5 inches.

7. A gin hoist for use on a cross arm, comprising:
    a base support structure with a lower yoke end including an upper support and a lower support between a first pair of side rails wherein the upper support and lower support are each adapted for positioning above and below a cross arm;
    a first strap support member;
    an extending support structure including at least two support arms attached at one end to the base support structure;
    a second strap support member at the other end of the extending support structure;
    an anchor support structure extending from the upper support over the lower yoke at an angle relative to the first pair of side rails of less than 90 degrees;
    a second pair of side supports attached to the base support structure at a first end and to the anchor support structure at a second end; and
    a wheel supported by the pair of side supports and the anchor support structure.

8. The gin hoist of claim 7, further comprising:

a hoist attached to the base support structure having a strap with a proximate and a distal end;

the strap engaged into the hoist at its proximate end;

the strap running over the first strap support member and over the second support member; and a line engagement member at the distal end of the strap.

9. The gin hoist of claim 7, further comprising:

an inner support structure with a first end and a second end;

wherein the first end is attached to the base support structure; and the second end is attached to the extending support structure.

10. The gin hoist of claim 7, wherein the distance between the center of the lower support and the center of the upper support is about 4.5 to about 5.5 inches.

11. The gin hoist of claim 10, wherein the distance between the center of the lower support and the center of the upper support is about 4.5 to about 5.0 inches.

12. The gin hoist of claim 10, wherein the distance between the center of the lower support and the center of the upper support is about 5.5 inches.

* * * * *